Patented May 4, 1954

2,677,644

UNITED STATES PATENT OFFICE 2,677,644

PURIFICATION OF VITAMIN B12 SOLUTIONS

Merton C. Lockhart, Pearl River, N. Y., and George Herman Michel, Dumont, N. J., assignors to American Cyanamid Company, New York, N. Y., a corporation of Maine No Drawing. Application October 25, 1951, Serial No. 253,204

6 Claims. (Cl. 167—81)

This invention relates to processes of purifying vitamins, more particularly to a process of removing impurities from aqueous solutions of vitamin B12. This application is a continuation-in-part of our application Serial No. 241,392 filed October 10, 1951, now abandoned.

Recently, a substance having vitamin-like properties has been isolated in crystalline form from liver extracts and certain fermentation liquors. This substance which has been generally characterized as a cobalt coordination complex has been designated as vitamin B12. Efforts to obtain this material in crystalline form have been continuing since the discovery by Minot and Murphy in 1926 (J. Amer. Med. Ass. 1926, 87, 470) that liver contained a substance that was effective in the treatment of pernicious anemia. Preparation of increased purity and therapeutic efficacy have been obtained by numerous workers until the vitamin was finally obtained in crystalline form.

Unfortunately, the attempts to isolate the vitamin from its associated impurities have been complicated by the fact that vitamin B12 existed in natural materials in extremely minute amounts, in the order of one part per million. Furthermore, it appears that vitamin B12 exists in several different modifications and possibly in conjugated form with proteinacious materials. Also, other substances present in liver possess similar physiological properties which made assays of the concentrated preparations difficult to evaluate.

Methods of concentration and purification have generally included physical techniques such as adsorption of the vitamin on adsorbing agents such as charcoal, alumina, silica gel, siliceous earths, and the like, followed by elution with various solvents. In these adsorption processes the active material is usually adsorbed while the impurities remain in the solution. Modifications of the adsorption procedure, such as chromatography, have been successfully employed. Other techniques which employed the differential solubility of the vitamin in specific solvents have been used to some extent. Precipitation of the vitamin has also been attempted. Actually, the recovery of the vitamin in crystalline form required a combination of physical methods which were cumbersome and difficult to employ on a commercial scale.

Since relatively unlimited sources of vitamin B12 are now available in the fermented liquors produced by various microorganisms and as vitamin B12 is accepted as the anti-pernicious anemia factor and is being widely used in medicine, there has been created a serious need of simplified procedures of obtaining larger supplies of the vitamin in a form suitable for therapeutic use.

The sources of vitamin B12 for use in the present invention include numerous aqueous solutions containing the vitamin. These include aqueous extracts of liver. A more abundant source is the waste liquor resulting from the preparation of antibiotics by some of the species of Streptomyces including particularly *S. aureofaciens* and *S. griseus*. Other microorganisms such as *S. rimosus*, *Clostridium butyricum*, *Basillus megatherium*, *Eremothecium ashbyii*, *Flavobacterium solare* and many other bacteria, yeasts and fungi produce vitamin B12 in fermentation process and these liquors may be used herein. Sewage effluent is also found to contain vitamin B12 and such clarified liquors may prove to be a commercially practical source of the vitamin using the process of the present invention.

As noted above, most of the previous methods of purifying vitamin B12 have been employing techniques in which it was isolated from its associated impurities by adsorption on active materials. We have discovered, however, that the process of purifying vitamin B12 can be greatly simplified by a one step procedure in which the various impurities commonly found with vitamin B12 are adsorbed and the vitamin is allowed to remain in solution. In our process, the undesirable materials, chiefly pigments of unknown composition, are almost completely adsorbed while the active vitamin substance is recovered in its original aqueous solution unchanged in almost quantitative yields.

We have found that insoluble compounds of zirconium may be used as adsorbing agents to remove impurities from aqueous solutions containing vitamin B12 without adsorbing and simultaneously removing vitamin B12. Although water insoluble zirconium compounds have been used for many years as adsorbing agents, it is strange, indeed, that these materials do not adsorb vitamin B12 which is so readily adsorbed by most of the common adsorbing agents now in use. Among the insoluble zirconium compounds that may be used in our process are included zirconium dioxide, zirconium carbonate, zirconium hydroxide, zirconium silicate and other insoluble zirconium compounds. By the term insoluble, we mean to include those compounds which are not soluble in aqueous solutions to a degree which would interfere with the adsorption process. When using the several techniques that are applicable, we prefer that the zirconium compound not be soluble to the extent of more than about 1% by weight in aqueous solutions at the hydrogen ion concentrations of the process as set forth hereinafter.

Zirconium dioxide is available in a form of hydrate of the formula $ZrO_2.xH_2O$ in which $x$ is a continually variable quantity. The material is a white slurry of a moderately stiff consistency as obtained from the manufacturer, and this material also should not be allowed to dry as it appears to lose its ability to adsorb impurities upon drying.

Zirconium carbonate is available in a form of hydrate which is characterized by the manufacturer as Zirconium Hydrate (Carbonated). The material is a white slurry of a moderately stiff consistency and should not be allowed to dry as it appears to lose its ability to adsorb impurities upon drying. Zirconium hydroxide suitable for use in the process of the present invention may be prepared from the above zirconium carbonate as follows: To 235 lbs. Zirconium Hydrate (Carbonated) are added 200 liters of water whereupon the mixture is slurried and then agitated sufficiently to form a homogeneous blend. While agitation is continued, 135 lbs. of 93% sulfuric acid are added. This procedure yields a water white solution of zirconium sulfate. Next are added 144 lbs. of ammonium hydroxide (26–28%) to obtain pH 8.0 whereupon a white gelatinous precipitate of zirconium hydroxide is obtained. The mixture is filtered and the cake recovered. This cake is then suspended in 350 liters of water and again filtered. The resulting press cake is considered to be zirconium hydroxide. The zirconium hydroxide, as in the case of the zirconium carbonate, should not be allowed to dry. Zirconium is a tetravalent element and, as will be found by reference to textbooks, is capable of forming various complexes in addition to those mentioned above. Those that are insoluble within the limits of the present invention may be employed in our process as will be described.

In carrying out our process, the adsorption of the impurities may be done by several methods. In one method, the aqueous solution containing vitamin B12 is slurried with the desired quantity of zirconium compound and then filtered. The filtrate contains the vitamin B12 whereas most of the impurities are retained in the filter cake. In another process, a column of the zirconium compound generally mixed with a filter aid, is prepared and the aqueous solution to be processed is passed through the column. The used zirconium compound from either method may be purified by conventional means and recycled. Both of these methods will be illustrated hereinafter.

Obviously, the amount of zirconium compound will vary with the amount of impurities contained in the vitamin B12 solution. Since vitamin B12 is not adsorbed to any appreciable extent on the zirconium compound under the condition of our process, the excess amount is of no consequence. On the other hand, if the amount of impurities is large and are not all adsorbed, they can be readily detected in the filtrate and can be removed by further contact with the zirconium compound in a second operation.

The temperature of the adsorption procedure may vary over a wide range from 0° C. to 75° C. but is preferably conducted at room temperature. The pH of the adsorption procedure may vary between 5 and 9. The aqueous B12 solution before treatment should be kept within the range of pH 2.5 and 8.5 preferably at pH 4.5. This is because of the fact that vitamin B12 is not stable in strong concentrations of acid or alkali.

The term vitamin B12 as used herein is intended to be of a generic nature to include the several physiologically active forms of vitamin B12 which have been reported in the literature. It appears that vitamin B12 as originally described contained a cyano radical. This group is readily replaced with other radicals such as the hydroxide and sulfate radicals and vitamin B12 has been thus chemically modified in various ways without seriously affecting its physiological activity. In fact, vitamin B12 appears to occur naturally in several of these forms and certain fermentation liquors contain a mixture of the different forms of vitamin B12. These have been variously designated by research investigators as vitamin B12a, B12b, B12c, cobalamine, cobalamine hydroxide, cobalamine sulfate and the like. Fortunately, these variations of the vitamin B12 molecule all respond similarly in the process of the present invention and are not adsorbed on hydrous zirconia nor do they affect the adsorption of the various impurities thereon. Accordingly, the term vitamin B12 is used herein to include all of these several known related physiologically active adsorbable forms which have been heretofore referred to.

To illustrate our process in greater particularity, the following examples are given. It will be understood, of course, that these are merely preferred techniques of the present and that obvious modifications and improvements may be made thereon by those skilled in the art. Our process is not limited to the treatment of any particular solution containing vitamin B12, except as indicated by the pH limits named above, nor is the process limited to the particular amounts or concentrations illustrated herein below, except as set forth in the appended claims.

*Example 1*

An aqueous solution containing vitamin B12 is obtained from fermentation liquor produced by *S. aureofaciens* in the production of aureomycin. The fermentation liquor, preferably after butanol extraction of aureomycin therefrom and containing about 200 gammas of vitamin B12 per liter, is treated with activated charcoal (2 to 4 grams of charcoal per liter of fermentation liquor). The charcoal is washed with tap water to remove soluble salts present in the fermentation liquor after which the vitamin B12 activity is eluted therefrom. This is done by treating 1053 kg. of the charcoal with 4000 gal. of an aqueous solution containing about 7% by volume of amyl alcohol and 5% of isopropyl alcohol.

The eluate is evaporated to 75 gal. under vacuum to concentrate the activity to about 100 gammas of vitamin B12 per ml. To 500 ml. of the thick dark brown tar thus obtained is added 2000 ml. of an aqueous solution saturated with ammonium sulfate and 10 g. of filter aid. After stirring at room temperature for one hour, the mixture is allowed to stand overnight at 4° C. The precipitate that forms is separated and extracted with 2000 ml. of 65% ethyl alcohol. The extract is then adjusted to pH 1.5 by hydrochloric acid and allowed to stand overnight. The solution is then adjusted to pH 4.5 and concentrated to remove the ethyl alcohol. The aqueous solution which resulted is treated by the following procedure.

Three hundred fifty parts of hydrous zirconia, by volume (25-30% $ZrO_2.xH_2O$) is mixed with 350 parts of filter aid, by volume, and enough water, 3 parts by volume, to form a slurry. This mixture is placed in a chromatographic column and allowed to settle at atmospheric pressure for 30 minutes. Vacuum is applied to the lower end of the column after which it is washed with a little water.

Seven hundred milliliters of the concentrated ethyl alcohol extract containing about 70 gammas of vitamin B12 per ml. is passed through the zirconia column after which it is washed with water until all of the pink color retained therein is removed. The clear pink solution contains about 30 gammas of vitamin B12 per ml. and is found to be free of most of the impurities originally associated with it, and is suitable for use in many pharmaceutical applications without further concentration or purification.

*Example 2*

In this procedure, the same quantity of hydrous zirconia as in Example 1 is slurried with an equal amount of the concentrated ethyl alcohol extract for 20 minutes and then filtered. The brown cake is washed with a little water to remove the contained vitamin B12. This filtrate is likewise found to be of greatly improved purity.

*Example 3*

A charcoal adsorbate obtained by treating *S. aureofaciens* fermentation liquor is extracted by treatment with an aqueous solution of mixed lower alcohols as described in Example 1 and the extract concentrated. This concentrated solution containing about 100 gammas of B12 per ml. is then passed through a column of zirconia and a pink solution obtained which is clean and suitable for pharmaceutical application. This procedure eliminates the ammonium sulfate precipitation and alcoholic extraction steps of Example 1, which are used only when it is deemed necessary to remove excessive amounts of peptone-like substances and other impurities soluble in saturated ammonium sulfate that may be present.

*Example 4*

To 480 liters of the hydrolyzed B12 65% ethyl alcohol extract as described in Example 1 are added 200 liters of water and 385 lbs. (wet weight) of zirconium hydroxide. The pH of this mixture is adjusted to 8.7 with ammonium hydroxide (26-28%). The mixture is then agitated for one hour, allowed to stand for approximately 14 hours and then filtered. The filter cake is washed with 100 liters of water. The washings and filtrate are then combined giving a clear, pink solution of volume 850 liters and containing 50 gammas of B12 per ml. This B12 solution is concentrated to remove the solvent. The resulting solution is suitable for use in many pharmaceutical applications without further concentration or purification.

The resulting filter cake containing brown impurities and is regenerated as follows: It is slurried with 200 liters of water and to this mixture are added slowly 210 lbs. of 93% sulfuric acid with agitation. The mixture is stirred for one hour. To this acid solution of zirconium sulfate 75 lbs. of activated charcoal are added, agitation is continued for one hour followed by filtration and a washing of the press cake with 50 liters of water. The filter cake is discarded. The water white zirconium sulfate filtrate is converted to zirconium hydroxide by adding slowly with agitation a 40% solution of sodium hydroxide (136 lbs. of NaOH made up to 154 liters with water). The white gelatinous precipitate of zirconium hydroxide is filtered off, slurried with 350 liters of water and filtered. The zirconium hydroxide press cake obtained is ready for recycling.

*Example 5*

To 444 grams of Zirconium Hydrate (Carbonated) is added one liter of the concentrated ethyl alcohol extract described in Example 1 and agitation continued for one hour at pH 6.1. The mixture is then filtered and the filter cake washed with water until all the pink color is removed as noted by the attainment of a colorless filtrate. The filtrate and washings are combined and concentrated, to remove solvent, to a volume of 250 ml. and a B12 assay of 116 gammas per ml.

As noted above, the adsorption process using zirconium compounds is applicable to aqueous solutions having a pH between 2.5 and 8.5 containing vitamin B12. The amount of vitamin B12 in the aqueous solution may range widely from a few gammas of vitamin B12 per ml. to relatively concentrated solutions thereof. Accordingly, our process is useful in the purification of vitamin B12 solutions obtained from the original fermentation liquor to steps just prior to the crystallization procedure, when such is desired.

Because of the extremely high efficiency of zirconium compounds in removing impurities, the final crystallization is not generally necessary or desirable. Our product, after the usual pharmacological tests for potency, purity, pyrogens and the like, where indicated, may be used as obtained.

What we claim is:

1. A method of purifying aqueous solutions containing vitamin B12 which comprises the step of contacting said solutions with hydrous zirconia and separating the aqueous solution containing vitamin B12 from the insoluble hydrous zirconia and the impurities adsorbed thereon.

2. A method of purifying aqueous solutions containing vitamin B12 which comprises the step of passing an aqueous solution containing vitamine B12 having a pH within the range of 2.5 to 8.5 through a bed containing hydrous zirconia and collecting the liquid passing through said bed.

3. A method of purifying aqueous solutions containing vitamin B12 which comprises the step of contacting said solutions with a water insoluble inorganic zirconium compound and separating the aqueous solution containing vitamin B12 from the water insoluble zirconium compound and the impurities adsorbed thereon.

4. A method of purifying aqueous solutions containing vitamin B12 which comprises the step of contacting said solutions with zirconium hydroxide and separating the aqueous solution containing vitamin B12 from the onsoluble zirconium hydroxide and the impurities adsorbed thereon.

5. A method of purifying aqueous solution containing vitamin B12 which comprises the step of contacting said solutions with carbonated zirconium hydrate and separating the aqueous solution containing vitamin B12 from the insoluble carbonated zirconium hydrate and the impurities adsorbed thereon.

6. A method of purifying aqueous solutions containing vitamin B12 which comprises the step of contacting said solutions with zirconium silicate and separating the aqueous solution containing vitamin B12 from the insoluble zirconium silicate and the impurities adsorbed thereon.

References Cited in the file of this patent

UNITED STATES PATENTS

| Number | Name | Date |
|---|---|---|
| 2,563,794 | Rickes | Aug. 7, 1951 |
| 2,582,589 | Fricke | Jan. 15, 1952 |

FOREIGN PATENTS

| Number | Country | Date |
|---|---|---|
| 590,956 | Great Britain | Aug. 1, 1947 |

OTHER REFERENCES

Fantes: Proceedings of the Royal Society (1950), pages 596 and 597.